Figure 1:
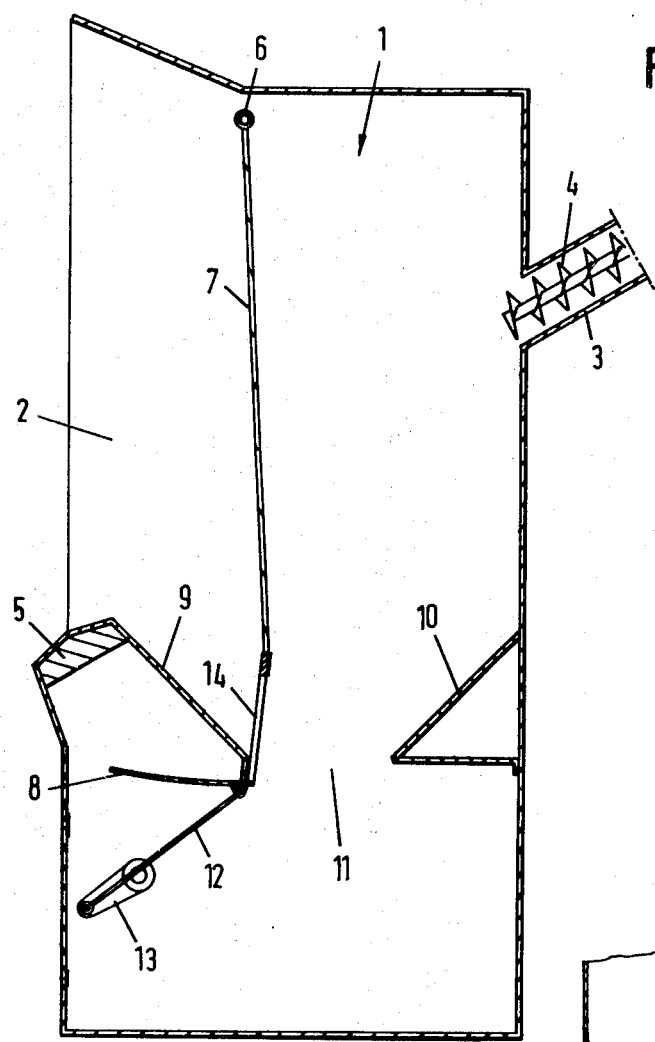

United States Patent [19]

Poiesz

[11] 4,297,974
[45] Nov. 3, 1981

[54] AUTOMATIC FEEDING APPARATUS

[75] Inventor: Gerardus W. Poiesz, Warnsveld, Netherlands

[73] Assignee: Brinkmann En Niemeyer N.V., Zutphen, Netherlands

[21] Appl. No.: 116,991

[22] Filed: Jan. 30, 1980

[30] Foreign Application Priority Data

Feb. 1, 1979 [NL] Netherlands ..................... 7900834

[51] Int. Cl.³ .................................................. A01K 5/02
[52] U.S. Cl. ................................. 119/51 R; 119/51.11
[58] Field of Search ................. 119/51 R, 53, 51.11, 119/51.12

[56] References Cited

U.S. PATENT DOCUMENTS

| | | | |
|---|---|---|---|
| 3,112,731 | 12/1963 | Lako et al. | 119/51 R |
| 3,465,724 | 9/1969 | Broadbent | 119/51 R |
| 3,541,995 | 11/1970 | Fathauer | 119/51 R |
| 3,587,530 | 6/1971 | Blair | 119/51.11 |
| 3,850,145 | 11/1974 | Yoder et al. | 119/51 R |
| 4,059,071 | 11/1977 | Van Huis et al. | 119/51.12 X |
| 4,188,912 | 2/1980 | Smalley | 119/51 R |
| 4,196,697 | 4/1980 | Poiesz | 119/51 R |

FOREIGN PATENT DOCUMENTS 2739069 3/1978 Fed. Rep. of Germany .... 119/51 R

Primary Examiner—G. E. McNeill
Assistant Examiner—Robert P. Swiatek
Attorney, Agent, or Firm—Daley & Brandt

[57] ABSTRACT

Livestock feeding apparatus including a housing having a head insertion opening and a dosing device responsive to the presence of selected specimens of the livestock for presenting food within the housing. An animal may gain access to the food by inserting its head through the opening. A valve is mounted adjacent the head insertion opening for movement between a closed position in which the valve occludes the opening and an open position in which the valve does not occlude the opening. Mechanisms are provided for moving the valve to the open position when one of the selected livestock specimens is present and returning the valve to the closed position after a predetermined period of time has elapsed. The valve prevents an animal from loitering in feeding position with its head inserted in the opening.

6 Claims, 2 Drawing Figures

AUTOMATIC FEEDING APPARATUS

The invention relates to an apparatus for feeding livestock, provided with a housing having a head insertion opening via which the animals can take in food, and comprising a dosing device for supply of food to the housing and responsive to the presence of selected specimens of the animals.

Such an apparatus is known from Dutch patent application No. 76,09780 of applicants. However, it has been found that an animal having already received the portions allocated to it, often nevertheless continues to stand near the apparatus, apparently expecting more food supply.

It is the object of the invention to provide an apparatus by means of which this phenomenon, the so-called "lazing about", is avoided.

To this effect an apparatus of the above described type is characterized by a valve disposed adjacent the head insertion opening, the operating means of which for moving, i.e. opening, the valve are likewise responsive to the presence of selected specimens of the livestock, while furthermore there are provided means for returning, i.e. closing, the valve to the starting position after a predetermined period of time.

The valve may be operated by a crank connecting rod mechanism connected to a motor incorporated in the current circuit of the motor for the dosing device.

Furthermore the connecting rod may likewise be connected to discharge means for food leavings, thus preventing a following animal from getting besides its allocated portion, also the leavings left behind by its predecessor.

It has been experimentally found that the apparatus is particularly suitable for watering calves which are fed for this purpose via a teat, since calves have the tendency, after having consumed their allocated portion, to continue nibbling the teat, thus preventing other animals from drinking.

Some embodiments of the apparatus for feeding livestock will now be described, by way of example, with reference to the accompanying drawing.

Figure 2:
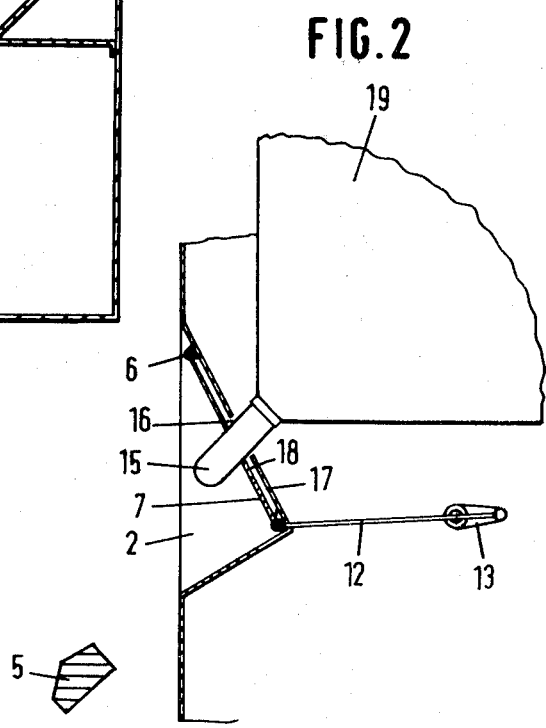

FIG. 1 is a diagrammatic longitudinal section of an apparatus for feeding cows and FIG. 2 is a view in accordance with FIG. 1 of a part of the apparatus for feeding calves.

According to FIG. 1 an apparatus for feeding cows is provided with a housing 1 having a head insertion opening 2 and a food supply 3 wherein is arranged a dosing worm 4. The dosing worm may be driven by a motor, not shown, which is operated by a computer, not shown, receiving its data from a transmitter-receiver 5 responsive to a code attached to the neck chain of a cow.

In the housing there is furthermore accommodated a valve 7 pivotable about a shaft 6, which valve is provided at the bottom with a closure valve 8 adapted to shut off a bottom opening 11 formed in the housing by two inclined walls 9 and 10. As furthermore appears from the drawing, valve 7 is provided at the side of the closure valve 8 with an opening 14 for passing the food supplied through the worm 4. To the closure valve 8 is furthermore connected a connecting rod 12 the other end of which is coupled to a crank 13. The crank 13 is attached to the output shaft of a motor, not shown.

The apparatus is operated as follows.

When a cow still being entitled to one or more food portions arrives at the food though, the transmitter-receiver 5 is operated which transmits its data to the computer which in turn operates or not the motor coupled to the worm 4, as well as the motor coupled with the connecting rod 12 in such a way that the opening 11 is shut off, the valve 7 is moved backwardly and the worm 4 is operated for the supply of food which then falls via the opening 14 onto the closure valve 8 and thus is accessible to the cow. After a given period of time sufficient for the cow to consume the portion allocated to her, the motor to which the connecting rod 12 is coupled is again actuated in such a way that the crank is submitted to a rotation through 180°, thus releasing the opening 11 so that possible food leavings are discharged via the openings 14 and 11, but whereby likewise the valve 7 presses against the head of the cow in such a way that she is forced to retract her head from the insertion opening. It is thus attained that the cow does not continue to "hang about" near the feeding apparatus, so that other cows cannot get their due.

FIG. 2 diagrammatically shows a part of an apparatus for feeding calves, wherein the same parts are indicated with the same reference numerals as used in the apparatus shown in FIG. 1. It concerns an apparatus for dosing milk or the like which the calf may consume via a teat 15. The teat 15 is connected via an opening 16 in a stationary closing plate 17 in the head insertion opening 2 of the housing 1 to a diagrammatically shown dosing device 19. As appears from FIG. 2 the head insertion opening 2 is shut off by means of a valve 7 rotatably suspended through a pivot 6, which valve is provided with a passage 18 for passing the teat 15. The lower end of the valve 7 is connected in the same manner as shown with the apparatus in FIG. 1 to a connecting rod 12 the other end of which is connected to a crank 13 disposed on the shaft of a motor, not shown.

The operation of the apparatus will be clear. When the automatic feeding apparatus is approached by a calf having a code attached to the neck chain, said code is received by the transmitter-receiver 5 arranged in front of the head insertion opening. Said transmitter-receiver transmits the received information to the computer, not shown, which subsequently engages or not the dosing device 19 and the motor for displacing the valve 7. After a predetermined period of time which is sufficient for consuming the supplied quantity of milk, the motor coupled to the crank 13 is again actuated moving the crank through 180° so that the valve 7 is again returned to the starting position and thereby pressing against the head of the calf and consequently forcing same to retract its head from the insertion opening. As a result a continued nibbling of the teat by the calf is prevented.

It will be clear that a great many alterations in respect of the embodiment of the various parts are possible within the scope of the inventive idea.

What I claim is:

1. Livestock feeding apparatus of the type having:
   (a) a housing having a head insertion opening; and
   (b) dosing means responsive to the presence of selected specimens of the livestock for presenting food within said housing so that the food so presented is accessible through said opening, wherein the improvement comprises:
   (c) a valve mounted adjacent said head insertion opening for movement relative to said housing between an open position in which said valve does not occlude said opening and a closed position in which said valve occludes said opening;

(d) valve opening means responsive to the presence of said selected specimens of the livestock for moving said valve from said closed position to said open position; and (e) valve closing means for returning said valve from said open position to said closed position when a predetermined period of time has elapsed after movement of said valve to said open position.

2. Apparatus as claimed in claim 1 in which said valve opening means is operative upon actuation of said dosing means.

3. Apparatus as claimed in claim 1 or claim 2 in which said valve opening means includes a motor, a crank connected to said motor and a connecting rod connected to said crank and to said valve.

4. Apparatus as claimed in claim 3 in which said valve closing means includes said motor, said crank and said connecting rod.

5. Apparatus as claimed in claim 1 further comprising means for discharging any food leavings from said housing upon movement of said valve to said closed position.

6. Apparatus as claimed in claim 5 in which said housing has a food discharge opening, said means for discharging including said discharge opening and a closure valve connected to the first-said valve for movement therewith, said closure valve occluding said discharge opening only when the first-said valve is in said open position.

* * * * *